UNITED STATES PATENT OFFICE.

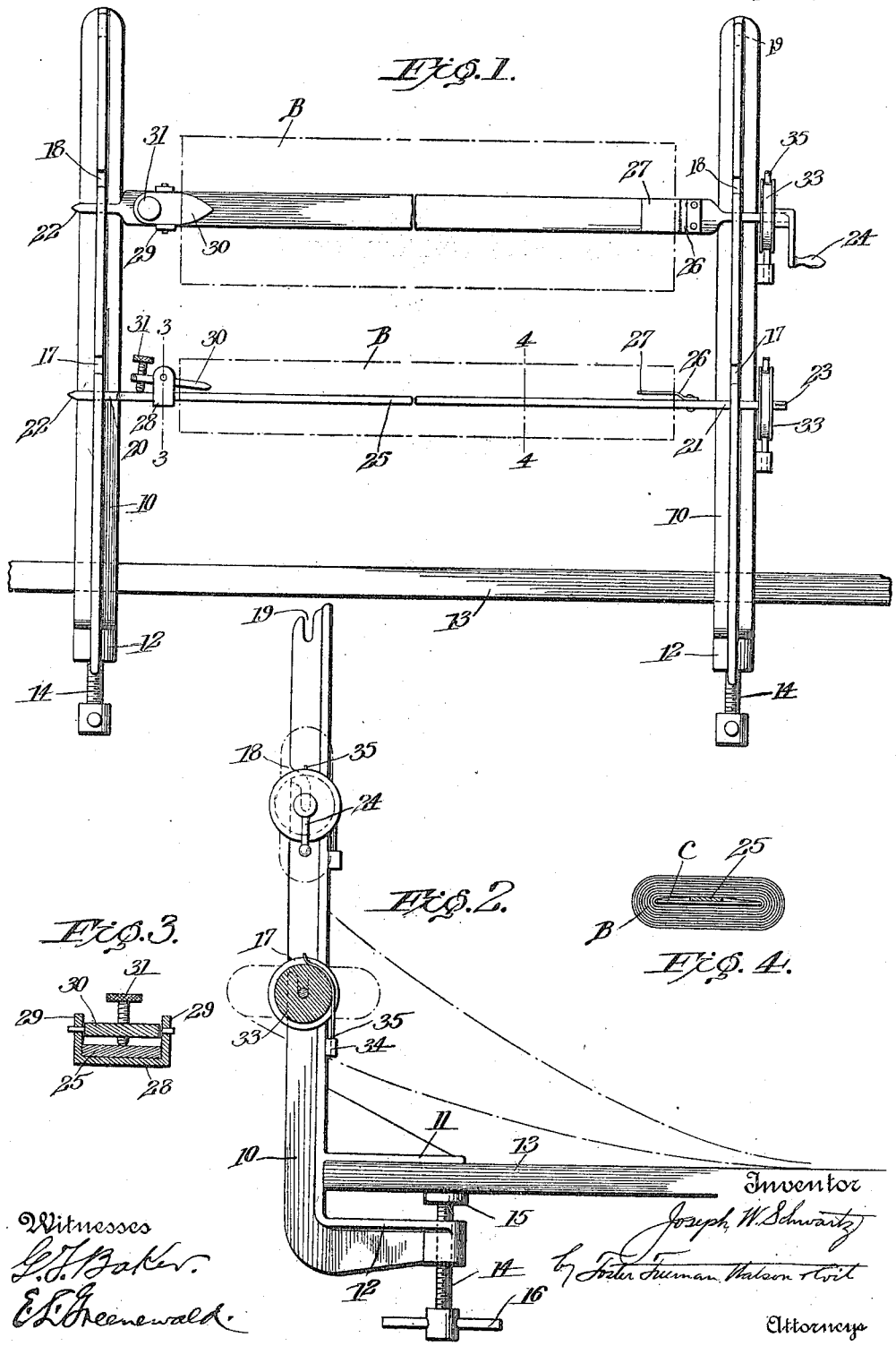

JOSEPH W. SCHWARTZ, OF NEW YORK, N. Y.

CLOTH-WINDING MACHINE.

1,222,038. Specification of Letters Patent. Patented Apr. 10, 1917.

Application filed November 12, 1915. Serial No. 61,096.

*To all whom it may concern:*

Be it known that I, JOSEPH W. SCHWARTZ, a citizen of the United States, residing at New York, county and State of New York, have invented certain new and useful Improvements in Cloth-Winding Machines, of which the following is a specification.

My invention relates to cloth winding machines and more particularly to a machine for use in clothing manufacturing establishments where a number of pieces of the same pattern are cut from different bolts of cloth, the loose ends of which are superposed on one another.

The principal object of the invention is to provide a machine which may be readily mounted on a support such as a cutting table and which will support a number of bolts of cloth so that they may be unwound and laid across the table and superposed on one another for the purpose of cutting a number of pieces of the same pattern therefrom, and so that the loose ends may afterward be wound back on the bolt.

Other objects and the novel features of the invention will be apparent from the following description taken in connection with the drawings, in which, Figure 1 is a side elevation of a cloth winding machine embodying my invention and showing the same supported on a cutting table;

Fig. 2 is an end elevation of the same, one part thereof being shown in section;

Fig. 3 is a transverse section on the line 3—3 of Fig. 1; and

Fig. 4 is a transverse section on the line 4—4 of Fig. 1.

Referring to the drawing, the cloth winding machine embodying my invention comprises two upright standards 10, which are designed to support between them a plurality of spindles which are shaped so as to engage bolts of cloth. The two standards are in most respects similar to one another and one of them only will be described. The standard consists of a single casting provided at its lower end with right angle extensions 11 and 12 spaced apart to provide a jaw adapted to fit a suitable support, such as the cutting table 13. In order to secure the standard in place on the cutting table, the lower jaw member 12 has a clamping screw 14 threaded therein, the upper end of the screw having a head 15 which engages the under side of the table and clamps the latter between it and the jaw member 11. The screw is provided with a suitable handle such as the pin 16 whereby it may be readily turned. The front edge of the standard has a plurality of spaced notches 17, 18 and 19, which form the bearings for the spindles or shafts which support the bolts of cloth. The notches 17 and 18 extend into the standard 10 substantially at right angles thereto for a short distance and then downwardly substantially parallel to the edge so that the shafts will be held in place in the bearings. The upper notch 19 is arranged at the top end of the standard to form a bearing.

The spindles or shafts which support the bolts of cloth are in most respects similar to one another and only one of them will be described. Each spindle comprises a bar having portions 20 and 21 rounded to fit the bearings in the standards. The spindle is also pointed at one end as at 22 for a purpose to be described and at the opposite end it is angular, as at 23, to fit a suitable crank handle 24 by means of which the spindle may be turned to wind or unwind the cloth.

As shown in Fig. 4, the ordinary bolt of cloth B has a core C of some material such as heavy pasteboard or wood upon which the cloth is wound, forming a bolt which is substantially rectangular in cross section. In order to fit into the bolt next to the core C, the spindle is provided with a flattened portion 25 which is located between the round parts 20 and 21 thereof. The flattened portion of the spindle will therefore not distort the shape of the bolt when the spindle is in place therein. At one end of the flattened portion 25 there is a stop plate 26, one end of which is riveted to the spindle and the other end of which is bent outwardly, and then parallel to the flat portion of the spindle, as at 27. When it is desired to put a bolt on a spindle the spindle is passed, pointed end first, through the center of the bolt next to the core C, the pointed end preventing the spindle from catching in the cloth as the spindle is pushed through the bolt. The plate 26 limits the movement of the bolt at one end, the portion 27 of the plate engaging the core of the bolt on the opposite side thereof from the flat portion 25 of the spindle.

In order to keep the bolt from moving endwise on the spindle, I provide a U- shaped yoke 28 which may be slipped over the end of the flat portion of the spindle and has upright parts 29 in which a plate 30 is pivoted. The plate 30 is pointed at its end and may be slipped into the bolt, engaging that side of the core C opposite the side engaged by the flat part 25 of the spindle. The plate 30 carries a threaded clamping screw 31 which is located on the opposite side of the pivot from the bolt engaging portion of the plate and by turning the screw 31 in the proper direction the bolt engaging end of the plate 30 will clamp the core between it and the spindle 25. The plates 26 and 30 at the opposite ends of the flat part of the spindle limit the endwise movement of the core on the spindle and rigidly hold the bolt in place on the spindle. When the bolt is fastened in place on the spindle the latter with the bolt thereon may be lifted into place in a pair of oppositely disposed notches and the cloth may be unwound from the bolt by simply pulling the loose end thereof on the bolt.

In order that the spindle may not too readily unwind, I provide a friction braking means for the spindle which consists of a grooved wheel 33 fixed on the spindle near the squared end 23 thereof. The standard adjacent the wheel 33 is provided with a lug 34 in which one end of a curved spring plate 35 is secured. The other end of the spring plate 35 is bent around the wheel 33 and rests for an extended portion of its surface against and in the grooved portion of the wheel 33. The spring 35 resiliently and frictionally engages the wheel 33 fixed on the spindle and prevents the latter from turning too freely. In addition, the spring 35 extends far enough around the wheel to yieldingly hold the spindle in its bearings. By use of the crank handle 24 the bolts may readily be rewound when through cutting, thereby preventing tangling and soiling of the cloth.

From the foregoing description it will be seen that I have provided a cloth winding machine which, being composed of a number of separate and easily handled parts, may be conveniently carried about and either be used in cutting a number of pieces of the same pattern from a plurality of bolts, or the machine may be used to simply display the material of a number of different bolts of cloth. The spindles are designed so that the bolts may be easily put on and taken off and so that when the bolts are on the spindles they will be securely held thereon.

While I have shown and described the preferred form of the invention I do not wish to be limited to the exact details as various changes may be made in the structure without departing from the spirit of the invention.

Having thus described the invention, what is claimed and desired to be secured by Letters Patent is:

1. A portable cloth winding machine which is readily taken apart and also readily reassembled comprising a pair of separate portable standards each of which has a jaw at its lower end to fit the edge of a table and means for clamping each standard to a table independently of the other, said standards having notches or recesses within the vertical edges thereof to form bearings, bolt supporting spindles supported above one another in said notches, and means whereby the spindles are held in said notches or bearings and also prevented from turning too freely in their bearings when the cloth is unwound.

2. A cloth winding machine comprising a pair of separate standards having jaws at their lower ends to receive the edge of a table and means on said jaws for clamping the standards to the table, said standards having notches therein forming bearings in those edges thereof which face away from the table upon which they are clamped, bolt supporting spindles mounted one above the other in said notches and having flat parts intermediate the standards adapted to fit against the flat cores of bolts of cloth, one end of each spindle being pointed and each spindle being equipped with a fixed stop plate at one end of the flat portion thereof and an adjustable pivoted pointed clamping stop plate at the other end of the flat portion thereof, said stop plates being adapted to engage the side of the core opposite the side engaged by the flat portion of the spindle whereby each core is clamped between the spindle on one side and the stop plates on the other side, means whereby the spindles are held in said notches or bearings and also prevented from turning too freely in their bearings when the cloth is unwound and means whereby said spindles may be engaged to be turned to wind the cloth onto the bolts supported thereon.

3. A cloth winding machine comprising a pair of standards having bearings therein, bolt supporting spindles rotatably mounted in said bearings, and means for preventing said spindles from turning too freely in their bearings when the cloth is unwound from said bolts comprising a wheel fixed on each of the spindles and a spring adapted to frictionally engage the wheel to prevent it from turning too freely, and also to hold the spindle in its bearings.

4. A spindle for a cloth winding machine comprising a bar, a stop near one end thereof, a yoke fitting the other end of said bar and adjustable lengthwise thereof, a clamping stop pivoted intermediate its ends on said yoke, one end of said pivoted stop being adapted to assist in holding a bolt of cloth on said bar and against the other stop, and a threaded device for engaging the other end of said pivoted stop to clamp or release it.

5. A cloth winding machine which is readily taken apart and also readily assembled so that it may be readily carried from place to place as desired, said machine comprising a pair of portable standards having means whereby they may be clamped to a support at different distances apart as desired, said standards being provided with bearings, and bolt supporting spindles mounted one above the other in said bearings, said bolt supporting spindles being readily removable from and replaceable in said bearings so that bolts of cloth may be readily removed from and replaced on said spindles and also in order that the machine may be readily taken down and set up.

In testimony whereof I affix my signature.

JOSEPH W. SCHWARTZ. [L. S.]

Witnesses:
JOSEPH W. COBURN,
ALBERT EARDENSOHN.